(12) United States Patent
Graban et al.

(10) Patent No.: US 8,389,145 B2
(45) Date of Patent: Mar. 5, 2013

(54) BATTERY ASSEMBLIES

(75) Inventors: Robert Graban, Livonia, MI (US);
Brian K. Bartnick, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 967 days.

(21) Appl. No.: 12/464,575

(22) Filed: May 12, 2009

(65) Prior Publication Data

US 2010/0291428 A1 Nov. 18, 2010

(51) Int. Cl.
*H01M 10/50* (2006.01)
(52) U.S. Cl. .......................... 429/120; 429/149; 429/163
(58) Field of Classification Search .................. 429/120, 429/163, 149
See application file for complete search history.

(56) References Cited

U.S. PATENT DOCUMENTS

2003/0232239 A1* 12/2003 Gow et al. ...................... 429/120

* cited by examiner

*Primary Examiner* — Jane Rhee
(74) *Attorney, Agent, or Firm* — Ingrassia Fisher & Lorenz, P.C.

(57) ABSTRACT

Battery assemblies have been provided. In an embodiment, by way of example only, a battery assembly includes a casing including a plurality of walls defining a coolant chamber and a battery cell pocket disposed in the coolant chamber including a container section, a lip, and a first spacer, the lip surrounding the container section and including a casing adjoining section and a pocket adjoining section, the casing adjoining section configured to couple to the casing, and the pocket adjoining section configured to couple to an adjacent lip of an adjacent battery cell pocket, and the first spacer protruding outwardly from the container section.

19 Claims, 3 Drawing Sheets

BATTERY ASSEMBLIES

TECHNICAL FIELD

The inventive subject matter generally relates to batteries, and more particularly relates to battery assemblies for use in automobiles.

BACKGROUND

In recent years, advances in technology, as well as ever evolving tastes in style, have led to substantial changes in the design of automobiles. One of the changes involves the complexity, as well as the power usage, of electrical systems within automobiles, particularly alternative fuel vehicles, such as hybrid, electric, and fuel cell vehicles. Such alternative fuel vehicles typically use an electric motor, in combination with a battery, to drive wheels of the vehicle.

In order to optimize battery performance, it is important to properly regulate the temperature (both cooling and heating) of the batteries used in, alternative fuel vehicles. Conventionally, temperature regulation systems utilize cooling channels formed in machined or stamped components that are placed adjacent to the cells. However, such systems often limit the surface area of the cells that are effectively cooled or heated. Additionally, because of the relatively high number of parts, such as seals, that are used to properly assemble the systems, manufacturing and maintenance costs may be undesirably high.

Accordingly, it is desirable to provide a system and method for regulating battery cell temperature with improved performance over those of conventional temperature regulation systems. Additionally, it is desirable to provide a system that has a reduced number of parts, as well as reduced manufacturing and maintenance costs as compared to conventional temperature regulation systems. Furthermore, other desirable features and characteristics of the present invention will become apparent from the subsequent description taken in conjunction with the accompanying drawings and the foregoing technical field and background.

BRIEF SUMMARY

Battery assemblies have been provided.

In an embodiment, by way of example only, a battery assembly includes a casing including a plurality of walls defining a coolant chamber and a battery cell pocket disposed in the coolant chamber including a container section, a lip, and a first spacer, the lip surrounding the container section and including a casing adjoining section and a pocket adjoining section, the casing adjoining section configured to couple to the casing, and the pocket adjoining section configured to couple to an adjacent lip of an adjacent battery cell pocket, and the first spacer protruding outwardly from the container section.

In another embodiment, by way of example only, a battery assembly includes a casing including a plurality of walls defining a coolant chamber and a plurality of battery cell pockets disposed in the coolant chamber, each battery cell pocket including a container section, a lip, and a first spacer, the container section having a first major heat transfer wall, a second major heat transfer wall, a first minor heat transfer wall, a second minor heat transfer wall, and a bottom wall, the first major heat transfer wall including a first indent section extending towards the second major heat transfer wall, the lip surrounding the container section and including a casing adjoining section and a pocket adjoining section, the casing adjoining section extending from the first minor heat transfer wall, and coupled to the casing, and the pocket adjoining section extending from the first major heat transfer wall and configured to couple to an adjacent lip of an adjacent battery cell pocket, and the first spacer protruding outwardly from the first major heat transfer wall or the second major heat transfer wall.

DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

FIGS. 1 to 4 illustrate an automobile and battery assemblies according to embodiments in which battery cell pockets that are welded together are included in a casing to isolate battery cells disposed in the battery cell pockets from a coolant. The battery cell pockets may include indent sections that are employed to maintain the battery cells in position within the battery cell pockets and to improve heat transfer between the battery cells and the coolant by increasing a surface area for the heat transfer to occur. Various other features discussed below may be employed to improve coolant flow through the casing to further improve heat transfer between the battery cells and the coolant.

Figure 1:
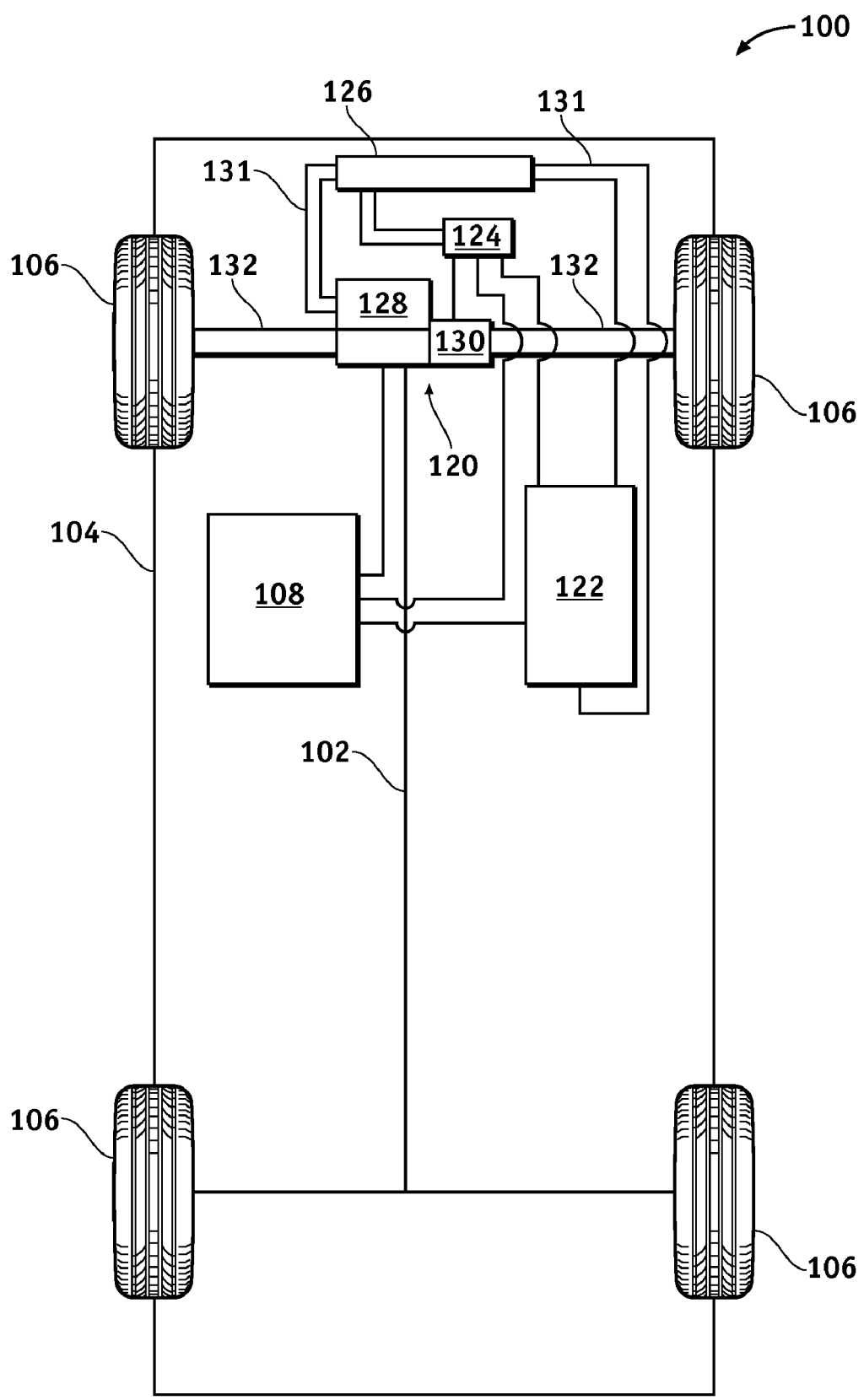
FIG. 1 is a schematic view of an automobile, according to an embodiment.

FIG. 1 is a schematic view of an automobile 100 (or vehicle), according to an embodiment. In an embodiment, the automobile 100 includes a chassis 102, a body 104, four wheels 106, and an electronic control system 108. The body 104 is arranged on the chassis 102 and substantially encloses other components of the automobile 100. The body 104 and the chassis 102 may jointly form a frame. The wheels 106 are each rotationally coupled to the chassis 102 near a respective corner of the body 104, in an embodiment.

The automobile 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 100 may also incorporate any one of, or combination of, a number of different types of engines, such as, for example, a gasoline or diesel fueled combustion engine, a "flex fuel vehicle" (FFV) engine (i.e., an engine that uses a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

According to an embodiment, the automobile 100 is an HEV, and further includes an actuator assembly 120, a battery system 122, an inverter 124, and a heat exchanger 126. The actuator assembly 120, the battery system 122, and the inverter assembly 124 are in operable communication with the electronic control system 108. The electronic control system 108 may include various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below.

The actuator assembly 120 includes a combustion engine 128 and an electric motor/generator (or motor) 130. In an embodiment, the combustion engine 128 and/or the electric motor 130 are integrated such that one or both are mechanically coupled to at least some of the wheels 106 through one or more drive shafts 132. In one embodiment, the automobile 100 is a "series HEV," in which the combustion engine 128 is not directly coupled to the transmission, but coupled to a generator (not shown), which is used to power the electric motor 130. In another embodiment, the automobile 100 is a "parallel HEV," in which the combustion engine 128 is directly coupled to the transmission by, for example, having a rotor of the electric motor 130 rotationally coupled to the drive shaft 132 of the combustion engine 128.

Although not shown in detail, the electric motor 130, in one embodiment, includes a stator assembly (including conductive coils or windings) and a rotor assembly (including a ferromagnetic core and/or magnets), as well as a transmission. The stator assembly and/or the rotor assembly within the electric motor 130 may include multiple electromagnetic poles (e.g., sixteen poles), as is commonly understood.

The battery system 122 may be configured to supply high voltage direct current (DC) power to the inverter 124, which may include a three-phase circuit coupled to the motor 130 to convert the DC power to alternating current (AC) power. In this regard, the inverter 124 may include a switch network having a first input coupled to the battery system 122 (i.e., a voltage source ($V_{dc}$)) and an output coupled to the motor 130. The switch network may include three pairs (a, b, and c) of series switches (e.g., insulated gate bipolar transistors (IGBTs) within integrated circuits formed on semiconductor substrates) with antiparallel diodes (i.e., antiparallel to each switch) corresponding to each of the phases of the motor 130.

The heat exchanger (e.g. a radiator and/or coolant sump) 126 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the actuator assembly 120, the battery system 122, and the inverter 124 though fluid conduits 131. It should be understood that the heat exchanger 126 may be used to both cool and heat the various components to which it is coupled. According to an embodiment, the inverter 124 receives and shares coolant with the electric motor 130 and the battery system 122. However, other embodiments may use separate coolants for the battery system 122, the inverter 124, and/or the electric motor 130.

Figure 2:
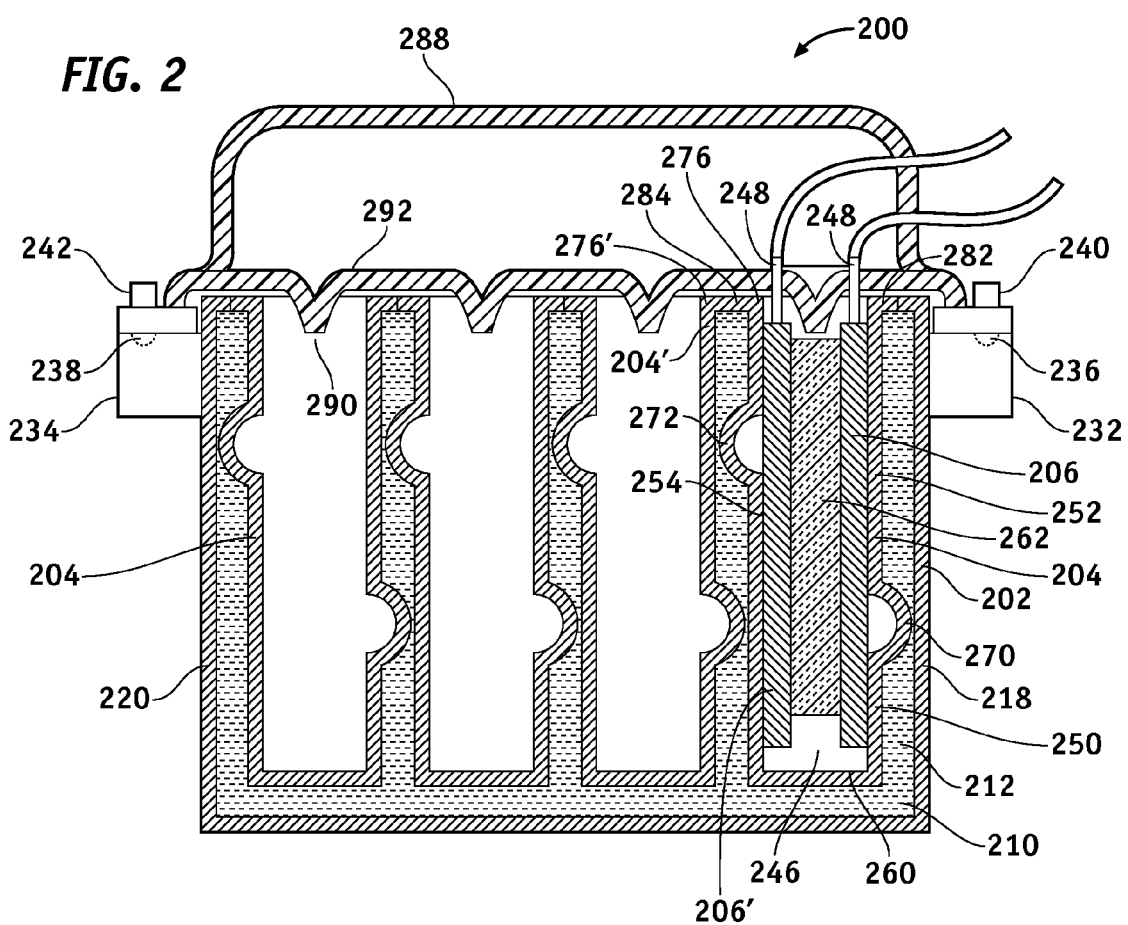
FIG. 2 is a cross-sectional side view of a battery assembly, according to an embodiment.
Figure 3:
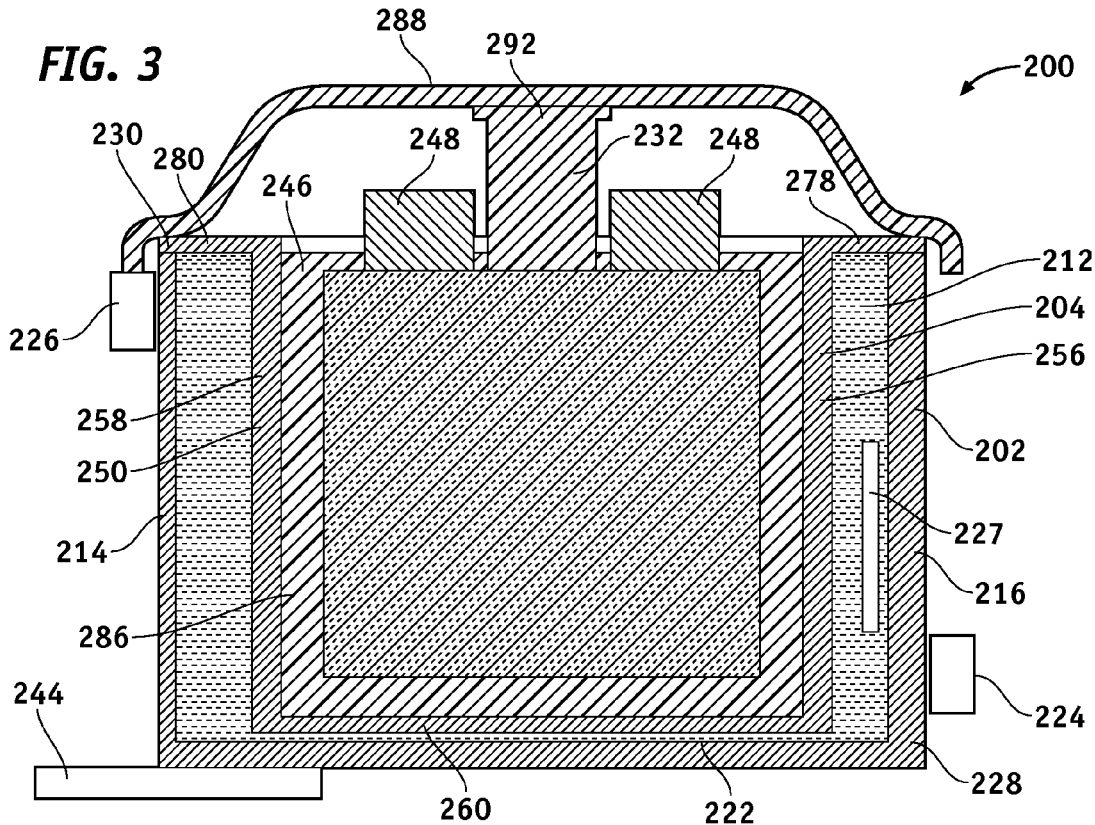
FIG. 3 is a cross-sectional end view of the battery assembly of FIG. 2, according to an embodiment.

FIG. 2 is a cross-sectional side view of a battery assembly 200, according to an embodiment, and FIG. 3 is a cross-sectional end view of the battery assembly 200, according to an embodiment. The battery assembly 200 may be implemented as the battery system 122, or a portion of the battery system 122, in FIG. 1. Thus, although only one battery assembly 200 is shown, it should be understood that the battery system 122 may include multiple battery assemblies 200 (e.g., between 5 and 10). According to an embodiment, the battery assembly 200 includes a casing 202, a plurality of battery cell pockets 204, a plurality of battery cells 206, and a cover assembly 208.

The casing 202 may define a coolant chamber 210 and may comprise, for example, a composite material or a metal, such as aluminum, that is suitable for containing coolant 212. In an embodiment, the casing 202 includes side walls 214, 216 (FIG. 3), end walls 218, 220 (FIG. 2), and a bottom wall 222. According to an embodiment, the casing 202 may have, for example, a length in range of from about 45 cm to about 90 cm, a width in a range of from about 20 cm to about 35 cm, and a height in a range of from about 30 cm to about 50 cm. In other embodiments, the casing 202 may have dimensions that are larger or smaller than the aforementioned ranges. In some embodiments, the particular length, width, and/or height of the casing 202 may depend on a desired number and dimensions of battery cell pockets 204 to be disposed in the coolant chamber 210. In any case, although the casing 202 is described as being box-shaped, other shapes may be suitable in other embodiment. In an embodiment, the coolant chamber 210 may have a shape that is substantially similar to that of the casing 202 (e.g., the interior of a box in this embodiment). In other embodiments, the coolant chamber 210 may have a different shape.

The casing 202 may also include an inlet (or first) port 224 and an outlet (or second port) 226 extending through the side walls 214, 216, in an embodiment. In other embodiments, the inlet and outlet ports 224, 226 may be formed through the end walls 218, 220. According to an embodiment, the ports 224, 226 are adapted to provide fluid communication between the coolant chamber 210 and the heat exchanger 126 (FIG. 1) by the fluid conduits 131 (FIG. 1). In an embodiment, the ports 224, 226 may have flow areas in range of from about 2 cm² to about 6 cm². In other embodiments, the flow areas of the ports 224, 226 may be larger or smaller than the aforementioned range. The inlet port 224 may have a smaller flow area than the outlet port 226, in an embodiment. In another embodiment, the inlet port 224 may have a larger flow area than the outlet port 226. In still other embodiments, the ports 224, 226 may have substantially equal flow areas. Because the sizing of the ports 224, 226 may fall within a relatively wide range of measurements, exact placement of the ports 224, 226 may depend on the port flow area sizing in conjunction with a particular desired flow pattern of the coolant through the coolant chamber 210. In this regard, the inlet port 224 may be formed through one corner 228 of the casing 202, while the outlet port 226 may be formed through another opposite corner 230 of the casing 202. In other examples, the inlet and outlet ports 224, 226 may be formed along a common axis that is parallel with a centerline of the casing 202. In still other examples, the ports 224, 226 may be formed in other sections of the casing 202.

Baffles 227 may be included to influence a direction of flow from the inlet port 224 to the outlet port 226. In an embodiment, one or more baffles 227 extend from one or both of the side walls 214, 216. The baffles 227 may comprise a rigid material such as aluminum or plastic and may include one or more plates that are rectangular, hemispherical or another shape forming a surface that is suitable for allowing coolant 212 to flow along. The baffles 227 may extend from the side wall 214, 216 along the bottom wall 222 or may extend from the bottom wall 222 along the side wall 214, 216. In other embodiments, the baffles 227 may alternatively or additionally extend from or along the end walls 218, 220. According to an embodiment, one or more of the baffles 227 are configured to contact one of the battery cell pockets 204, when the battery cell pocket 204 is disposed within the casing 202. In another embodiment, the baffles 227 do not contact other components in the battery assembly 200.

To secure the cover assembly 208 to the casing 202, fastener flanges 232, 234 may be included, in an embodiment. In an embodiment, the fastener flanges 232, 234 may extend from the end walls 218, 220 of the casing 202 and may include one or more fastener openings 236, 238 for receiving fasteners 240, 242. The fastener flanges 232, 234 may be integrally formed as part of the end walls 218, 220 or may be separate pieces that are attached to the casing 202. In other embodiments, the fastener flanges 232, 234 may extend from the side walls 214, 216. The fasteners 240, 242 may be bolts, screws, rivets or the like, in various embodiments. In an embodiment, a mounting bracket 244 may be included on the casing 202 and may be used to mount the battery assembly 200 to a desired location within the automobile 100. The mounting bracket 244 may be integrally formed as part of or may be coupled to the bottom wall 222, in an embodiment. In another embodiment, the mounting bracket 244 may be formed with or coupled to the side walls 214, 216 or the end walls 218, 220.

The plurality of battery cell pockets 204 are disposed within the coolant chamber 210 and are configured to retain corresponding battery cells 206 at particular locations within the coolant chamber 210. Each battery cell pocket 204 may comprise aluminum, magnesium, or another material that is capable of thermally conducting heat. In accordance with an embodiment, the battery cell pockets 204 are positioned in a side-by-side configuration and are welded, brazed or otherwise coupled to each other. Although four battery cell pockets 204 are shown disposed within the coolant chamber 210, more battery cell pockets 204 may be included in other embodiments. For example, ten or more battery cell pockets 204 may be included in an embodiment. Each battery cell pocket 204 defines a pocket cavity 246 within which one or more battery cells 206 or other components may be disposed. In one embodiment, the battery cells 206 comprise prismatic lithium ion battery cells, as are commonly understood. In other embodiments, other types of battery cells may be employed. In any case, the battery cells 206 may have lengths and widths that are substantially identical to or slightly small than those of the battery cell pocket cavity 246. According to an embodiment, the battery cells 206 may have, for example, lengths in range of from about 12 cm to about 20 cm, heights in a range of from about 20 cm to about 40 cm, and thicknesses in a range of from about 0.5 cm to about 1.0 cm. In other embodiments, the battery cells 206 may have dimensions that are larger or smaller than the aforementioned ranges. In an embodiment, the battery cells 206 also include first and second (e.g., positive and negative) terminals 248 that extend from an upper portion of the battery cell 206. The terminals 248 may extend from the coolant chamber 210 and the battery cell pocket cavity 246.

The battery cell pockets 204 each have a container section 250 and a lip 276. The container section 250 contains the battery cell 206 and includes two major heat transfer walls 252, 254 (FIG. 2), two minor heat transfer walls 256, 258 (FIG. 3), and a bottom wall 260. The major heat transfer walls 252, 254 have lengths that may define a length of the battery cell pocket 204 and the major heat transfer walls 252, 254 are configured to extend substantially parallel with the end walls 218, 220 of the casing 202. In an embodiment, the major heat transfer walls 252, 254 may have lengths in a range of from about 40 cm to about 85 cm, heights in a range of from about 25 cm to about 50 cm, and thicknesses in a range of from about 0.1 cm to about 0.15 cm. In other embodiments, the dimensions of the major heat transfer walls 252, 254 may be greater or less than the aforementioned ranges. In an embodiment, the height of the major heat transfer walls 252, 254 may be configured such that the bottom wall 260 is spaced apart from the casing 202, but allows a minimal amount of coolant to flow therebetween. For example, a gap between the bottom wall 260 and the casing 202 may have a distance in a range of from about 0.0 cm to about 1.0 cm. In other embodiments, the gap may be wider or narrower, depending on a desired path of flow along which the coolant is to travel around the battery cell pockets 204. In an embodiment, the gap may be narrower, if the flowpath is to be limited to travel around the major and minor heat transfer walls 252, 254, 256, 258. In other embodiments, the gap may be wider, if the flowpath is to travel along the bottom wall 260.

In any case, the surfaces of each major heat transfer wall 252, 254 that are configured to be adjacent to the battery cell 206 are larger than the adjacent surfaces of the battery cell 206. In this way, heat transfer between the battery cells 206 and the major heat transfer walls 252, 254 may be optimized. In one example, the major heat transfer walls 252, 254 may be substantially flat and may be parallel with each other. In accordance with an embodiment, the major heat transfer walls 252, 254 are spaced apart to allow one or more battery cells 206 to be disposed between the walls 252, 254. According to an embodiment, two battery cells 206, 206' are included in the battery cell pocket 204 and each major heat transfer wall 252, 254 contacts a surface of an adjacent battery cell 206, 206'. In such case, to improve friction contact between the battery cells 206, 206' and the major heat transfer walls 252, 254, an intermediate piece 262 may be disposed between the battery cells 206, 206'. For example, the intermediate piece 262 may comprise foam or an elastomer. In any case, the intermediate piece 262 preferably is a non-electrically conductive material that may or may not be thermally conductive.

Figure 4:
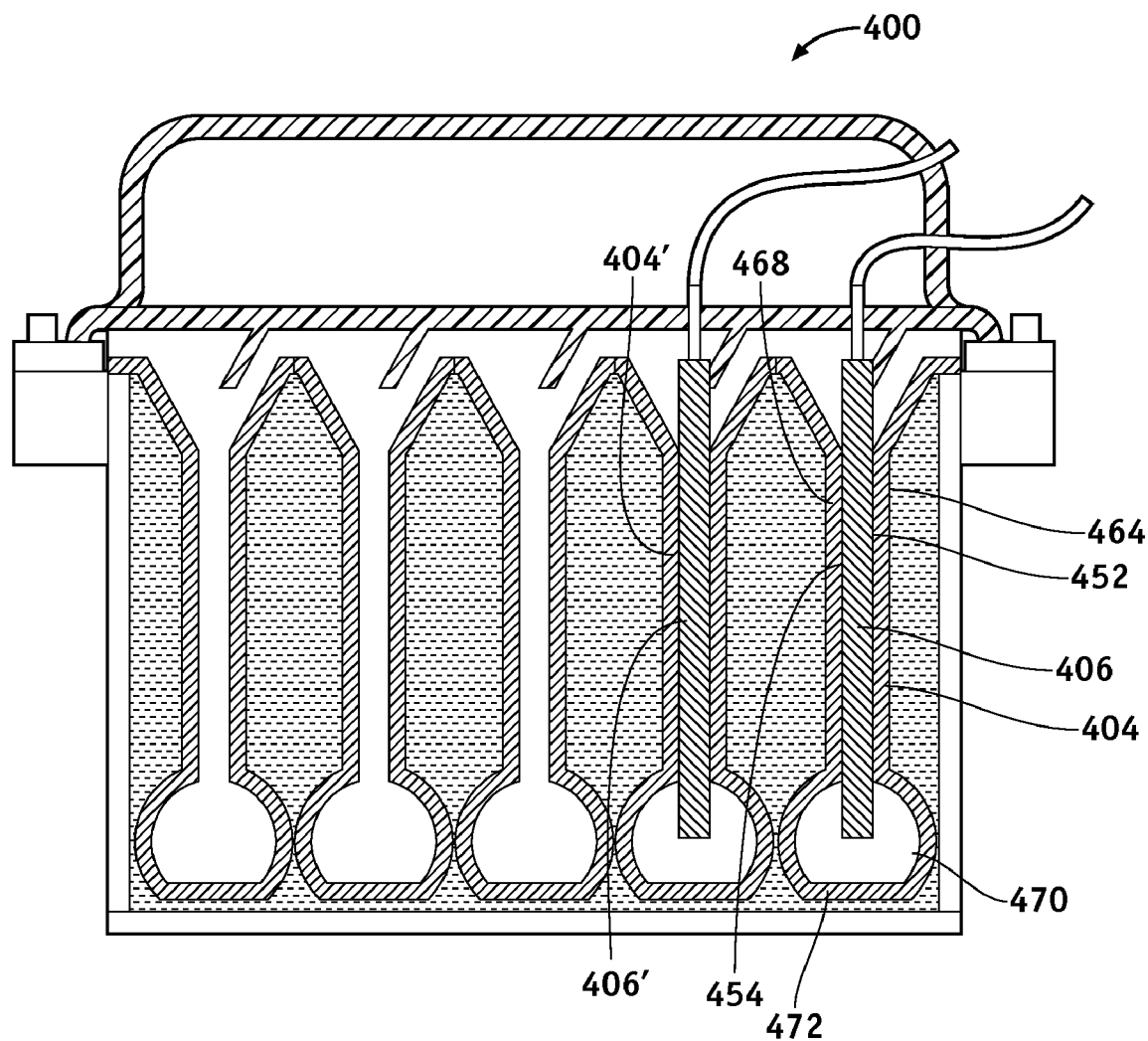
FIG. 4 is a cross-sectional side view of a battery assembly, according to another embodiment.

FIG. 4 is a cross-sectional side view of a battery assembly 400, according to another embodiment. Here, the battery assembly 400 includes a battery cell pocket 404 having major heat transfer walls 452, 454 that are not flat. In an embodiment, an upper portion of the major heat transfer walls 452, 454 extend towards each other, and each wall 452, 454 includes an indent section 464, 468 that contacts an adjacent surface of a battery cell 406. In an embodiment, the major heat transfer walls 452, 454 may include portions that curve or bevel towards each other and then curve or bevel away from each other to form the indent sections 464, 468. In another embodiment, the major heat transfer walls 452, 454 may include portions that only curve or bevel towards each other or portions that curve or bevel away from each other to form the indent sections 464, 468. In any case, the indent section 464, 468 of each major heat transfer wall 452, 454 provides a spring force against the battery cell 406 to thereby retain the battery cell 406 in a desired position within the battery cell pocket 404. In an embodiment, the major heat transfer walls 452, 454 may be configured such that the indent section 464, 468 contacts a majority of the battery cell 406, which may enhance thermal transfer of heat from the battery cell 406 to the coolant. Although both major heat transfer walls 452, 454 are depicted as having an indent section 464, 468, other embodiments may include one major heat transfer wall with an indent section and the other major heat transfer wall being substantially flat. In another embodiment, the major heat transfer walls 452, 454 may be configured so that a section of the battery cell 406 extends above the indent section 464, 468 to thereby allow ease of access to the battery cell 406 for removal from the battery cell pocket 404. Although a single battery cell 406 is shown in the battery cell pocket 404, more than one battery cell 406 may be included in other embodiments.

In an embodiment, one or both of the walls 252, 254, 452, 454 includes one or more spacers 270, 272, 470, 472. In the embodiment of FIG. 2, one or more spacers 270, 272 extend from the container section 250 and are configured to maintain spacing between the major heat transfer walls 252, 254 of two adjacent battery cell pockets 204, 204' thereby allowing coolant to flow along the major heat transfer walls 252, 254 in a desired manner. In the embodiment of FIG. 4, one or more spacers 470, 472 extend from the container section 450 and are configured to maintain spacing between the major heat transfer walls 452, 454 of two adjacent battery cell pockets 404, 404' thereby allowing coolant to flow along the major heat transfer walls 452, 454 in a desired manner. For ease of explanation, the spacers 270, 272 and other features of the battery cell pockets 204, 204' will be described in conjunction with battery cell pocket 204 in the battery assembly 200 shown in FIGS. 2 and 3. However, it will be appreciated that the spacer (e.g., spacers 470, 472) and other features may be incorporated with any other embodiment of the battery assembly (e.g. battery assembly 400 or another battery assembly that may not be illustrated).

In an embodiment, a first spacer 270 is formed on the first major heat transfer wall 252 and extends from a lower portion of the major heat transfer wall 252, and a second spacer 272 is formed on the second major heat transfer wall 254 and extends from an upper portion of the second major heat transfer wall 254. According to an embodiment, each spacer 270, 272 may comprise one or more elongated, ovular raised surfaces that extend outwardly along a majority of the length of a major heat transfer wall 252, 254. In another embodiment, the spacers 270, 272 may comprise one or more lines of hemispherical protrusions that extend along at least a portion of the lengths of the major heat transfer walls 252, 254. In still other embodiments, the spacer 270, 272 may protrude a distance from the walls 252, 254 and the protrusion distances of each spacer 270, 272 may be substantially equal to each other. In another embodiment, the protrusion distances of the spacers 270, 272 may not be equal to each other. In still another embodiment, the protrusion distances of the spacers 270, 272 may be in a range of from about 0.1 cm to about 0.5 cm. In another embodiment, the protrusion distances may be greater or less than the aforementioned range. In any case, the particular placements, dimensions, and configurations of the spacers 270, 272 may depend on a desired flowpath along which the coolant 212 may flow. For example, in embodiments in which the desired flowpath is to maximize flow velocity and minimize coolant mass, multiple linear ridges with low protrusion heights may be used.

The spacers 270, 272 may be integrally formed as part of its corresponding major heat transfer wall 252, 254, in an embodiment. In another embodiment, the spacers 270, 272 may be separate pieces that are welded, brazed or otherwise coupled to their respective major heat transfer walls 252, 254. Although the spacers 270, 272 are shown as being hemispherical in shape, as alluded to above, they may have any other shape suitable for maintaining spacing between adjacent pockets 206, 206'. According to an embodiment, all of the spacers 270, 272 may be substantially similar in shape (e.g., hemispherical, rectangular, etc.) and may have substantially similar dimensions. In other embodiments, the spacers 270, 272 may not have substantially similar shapes and/or dimensions. Moreover, in embodiments in which indent sections (e.g., indent section 464, 468) are included, the spacers (e.g., spacers 470, 472) may extend from the same walls on which the indent sections are located, in an embodiment. In other embodiments, the spacers may not extend from the same walls on which the indent sections are located.

According to an embodiment, the minor heat transfer walls 256, 258 may define a width of the battery cell pocket 204. In an embodiment, the widths of each minor heat transfer wall 256, 258 are at least as wide as a width of a battery cell 206. In an embodiment, the minor heat transfer walls 256, 258 may have lengths in a range of from about 0.5 cm to about 1.0 cm, heights in a range of from about 25 cm to about 50 cm, and thicknesses in a range of from about 0.1 cm to about 0.15 cm. In other embodiments, the dimensions of the minor heat transfer walls 256, 258 may be greater or less than the aforementioned ranges.

Each battery cell pocket 204 includes a lip 276 extending from its upper portion such that when the battery cell pockets 204 are disposed in the casing 202 in a side-by-side manner, the lips 276 form a substantially flat surface with slots formed therein. In an embodiment, the lip 276 may include casing adjoining sections 278, 280 (FIG. 3) and pocket adjoining sections 282, 284 (FIG. 2). In an embodiment, the casing adjoining sections 278, 280 (FIG. 3) and pocket adjoining sections 282, 284 (FIG. 2) comprise tabs that extend from the battery cell pocket 204. In other embodiments, the casing adjoining sections 278, 280 (FIG. 3) and pocket adjoining sections 282, 284 (FIG. 2) are formed such that the lip 276 surrounds an entirety of the battery cell pocket 204. In any case, the casing adjoining sections 278, 280 are adapted to extend at least from one casing side wall 214, 216 to the other when the battery cell pocket 204 is disposed in the casing 202.

To retain the coolant 212 within the casing 202, the casing adjoining sections 278, 280 may be brazed or otherwise sealingly coupled to the side walls 214, 216 of the casing 202, and the pocket adjoining sections 282, 284 are configured to be coupled, brazed or otherwise sealingly attached to a lip 276' of an adjacent pocket 204' and/or to the end walls 218, 220 of the casing 202.

The cover assembly 208 is also employed to maintain the coolant 212 within the casing 202. In an embodiment, the cover assembly 208 includes a sheet component 288, which may be disposed loosely or tightly over the casing 202. The sheet component 288 may comprise plastic, magnesium, aluminum or another material that is does not degrade when exposed to the coolant 212. In an embodiment, the sheet component 288 is coupled to the casing 202 at the fastener flanges 232, 234. For example, the sheet component 288 may be bolted to the casing 202. In another example, the sheet component 288 may be riveted to the casing 202.

To ensure that the battery cells 206 are retained in position within the battery cell pockets 204 and to prevent the battery cells 206 from contacting the bottom wall 260 of the battery cell pocket 204, a frame 286 may surround a portion of the battery cell 206. For example, in embodiments in which the battery cell 206 is smaller than the battery cell pocket 204, the frame 286 may be dimensioned to provide an inner cavity within which the battery cell 206 may be placed and an outer perimeter having dimensions that are substantially equal to or slightly less than a cavity 246 of the battery cell pocket 204. The frame 286 may comprise a woven plastic, molded plastic, foam or another non-conductive material capable of at least temporarily maintaining a structure for retaining the battery cell 206 in a desired position within the battery cell pocket 204.

In other embodiments, a cell retainer component 292 may additionally be employed to maintain the battery cell 206 inside the battery cell pocket 204. The cell retainer component 292 may be a rigid structure that extends across a length of the casing 202, in an embodiment. In an embodiment, the cell retainer component 292 may comprise plastic, rubber or another material capable of being formed into a structure sufficiently rigid to retain the cells in a desired position. The cell retainer component 292 may include a rod, a plate or another structure and further may include protrusions 290, which extend from the rod or plate to contact the battery cells 206. Although the cell retainer component 292 is shown as having an undulating structure, other configurations may be alternatively employed. For example, the cell retainer component 292 may include a straight rod with a plurality of straight flanges extending substantially perpendicular or at an angle relative to the rod.

By including the battery cell pockets 204 in the battery assembly 200, cooling of the battery cells 206 in the above-described battery assembly 200 may be improved over conventional battery assemblies. For example, during operation, referring to FIG. 1, the automobile 100 is operated by providing power to the wheels 106 with the combustion engine 128 and the electric motor 130 in an alternating manner, and/or with the combustion engine 128 and the electric motor 130 simultaneously. In order to power the electric motor 130, DC power is provided from the battery system 122 to the inverter 124, which converts the DC power into alternating current (AC) power, before the power is sent to the electric motor 130. As will be appreciated by one skilled in the art, the conversion of DC power to AC power is substantially performed by operating (i.e., repeatedly switching) the transistors within the inverter 124 at a "switching frequency" ($F_{sw}$), such as, for example, 12 kilohertz (kHz). Generally, the controller 136 produces a Pulse Width Modulation (PWM) signal for controlling the switching action of the inverter 124. The inverter 124 then converts the PWM signal to a modulated voltage waveform for operating the motor 130.

In order to regulate the temperature of the battery cells 206, 206', coolant (and/or anti-freeze) is provided to the battery system 122 from the heat exchanger 126 (FIG. 1). Referring to FIGS. 2 and 3, the coolant flows into the coolant chamber 210 through the inlet port 224 on the casing 202. As the coolant passes through the coolant chamber 210, the coolant surrounds the walls 252, 254, 256, 258, 260 of the battery cell pockets 204, 204'. By including the spacers 270, 272 and the baffles 227 and by defining a distance between the bottom wall 260 of the battery cell pockets 204, 204' and the bottom wall 222 of the casing 202, a designated flowpath may be customized through the battery assembly 200 to improved cooling of the battery cells 206. Additionally, because the battery cell pockets 204, 204' are welded together and to the casing 202, the coolant remains isolated from the battery cells 206, and heat exchange between the coolant and the battery cells 206 occurs through the surfaces of the battery cell pockets 204, 204'. Moreover, by disposing the battery cells 206 in individual pockets 204, 204' and configuring the battery cell pockets 204, 204' as described above, individual battery cells 206 may be removed and replaced, in an event in which repair is needed, rather than replacing an entire battery assembly 200.

As a result of allowing the coolant 212 to completely surround the portions of the battery cells 206 within the coolant chamber 210, the exchange of heat between the battery cells 206 and the coolant 212 is increased, and thus, temperature regulation, as well as battery performance, may be improved. Additionally, using the battery cell pockets 204, 204' as described above simplifies the battery assembly 200 by reducing the number of parts used to form the battery assembly 200. In addition, the useful life of the battery assembly 200 may be improved, as the use of elastomeric seals, which may tend to degrade over time, are eliminated. Consequently, manufacturing and repair costs may be reduced.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. A battery assembly, comprising:
   a casing including a plurality of walls defining a coolant chamber; and
   a battery cell pocket disposed in the coolant chamber including a container section, a lip, and a first spacer, the lip surrounding the container section and including a casing adjoining section and a pocket adjoining section, the casing adjoining section configured to couple to the casing, and the pocket adjoining section configured to couple to an adjacent lip of an adjacent battery cell pocket, and the first spacer defined in a first major heat transfer wall of the container section and protruding outwardly from the first major heat transfer wall of the container section into the coolant chamber.

2. The battery assembly of claim 1, wherein:
   the container section of the battery cell pocket includes the first major heat transfer wall and a second major heat transfer wall, the first major heat transfer wall including a first indent section curving towards the second major heat transfer wall.

3. The battery assembly of claim 2, wherein:
   the second major heat transfer wall includes a second indent section that curves towards the first major heat transfer wall.

4. The battery assembly of claim 3, wherein:
   the first indent section is integrally formed as part of the first major heat transfer wall.

5. The battery assembly of claim 3, wherein:
   the battery cell pocket includes a second spacer;

the first spacer extends outwardly from an upper portion of the first major heat transfer wall of the battery cell pocket into the coolant chamber; and the second spacer extends outwardly from a lower portion of the second major heat transfer wall of the battery cell pocket into the coolant chamber.

6. The battery assembly of claim 1, wherein:

the battery cell pocket includes a first major heat transfer wall and a second major heat transfer wall; and the battery assembly further comprises:
 a first battery cell disposed within the battery cell pocket;
 a second battery cell disposed within the battery cell pocket; and
 an intermediate piece disposed between the first battery cell and the second battery cell.

7. The battery assembly of claim 1, wherein:

the casing comprises a baffle extending from the container section into the coolant chamber.

8. The battery assembly of claim 1, further comprising:

a cover assembly coupled to the casing.

9. The battery assembly of claim 8, wherein:

the cover assembly comprises a plastic sheet.

10. The battery assembly of claim 1, further comprising:

a first battery cell including a terminal, and the terminal extending outside of the battery cell pocket.

11. The battery assembly of claim 1, further comprising:

a battery cell retainer component extending across a length of the casing, the battery cell retainer component including a protrusion extending downwardly into the battery cell pocket to contact a first battery cell disposed within the battery cell pocket.

12. The battery assembly of claim 1, further comprising:

a frame including an inner cavity and an outer perimeter, the inner cavity including a first battery cell disposed therein, and the outer perimeter configured to be substantially equal to or smaller in size than a cavity of the battery cell pocket.

13. A battery assembly, comprising:

a casing including a plurality of walls defining a coolant chamber; and a plurality of battery cell pockets disposed in the coolant chamber, each battery cell pocket including a container section, a lip, a first spacer and a second spacer, the container section having a first major heat transfer wall, a second major heat transfer wall, a first minor heat transfer wall, a second minor heat transfer wall, and a bottom wall, the first major heat transfer wall including a first indent section extending towards the second major heat transfer wall, the lip surrounding the container section and including a casing adjoining section and a pocket adjoining section, the casing adjoining section extending from the first minor heat transfer wall, and coupled to the casing, and the pocket adjoining section extending from the first major heat transfer wall and configured to couple to an adjacent lip of an adjacent battery cell pocket, the first spacer defined in and protruding outwardly from the first major heat transfer wall so as to extend into the coolant chamber and the second spacer defined in and protruding outwardly from the second major heat transfer wall so as to extend into the coolant chamber, wherein the first spacer and the second spacer maintain spacing between a first one of the plurality of battery cell pockets and a second one of the plurality of battery cell pockets.

14. The battery assembly of claim 13, wherein:

the first spacer extends outwardly from a lower portion of the first major heat transfer wall; and the second spacer extends outwardly from a lower portion of the second major heat transfer wall.

15. The battery assembly of claim 14, wherein:

the casing comprises a baffle extending from the container section into the coolant chamber.

16. The battery assembly of claim 14, further comprising:

a cover assembly coupled to the casing.

17. The battery assembly of claim 16, wherein:

the cover assembly comprises a plastic sheet.

18. The battery assembly of claim 13, further comprising:

a plurality of battery cells corresponding to and disposed within the plurality of battery cell pockets, each battery cell including a first surface in contact with the first major heat transfer wall and a second surface in contact with the second major heat transfer wall; and an undulating battery cell retainer component extending across a length of the casing, the battery cell retainer component including a protrusion extending downwardly into the battery cell pocket to contact a first battery cell.

19. The battery assembly of claim 13, further comprising:

a frame including an inner cavity and an outer perimeter, the inner cavity including a first battery cell disposed therein, and the outer perimeter configured to be substantially equal to or smaller in size than a cavity of the battery cell pocket.

\* \* \* \* \*